United States Patent
Ishii et al.

(10) Patent No.: US 7,812,599 B2
(45) Date of Patent: Oct. 12, 2010

(54) MAGNETIZED PULSAR RING, AND ROLLING BEARING DEVICE WITH SENSOR USING THE SAME

(75) Inventors: Yasuhiko Ishii, Kashiwara (JP); Tetsuaki Numata, Nara (JP); Naoki Morimura, Kashiba (JP); Nobutsuna Motohashi, Katsuragi (JP); Yoshifumi Shige, Kashiba (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 161 days.

(21) Appl. No.: 12/073,033

(22) Filed: Feb. 28, 2008

(65) Prior Publication Data

US 2008/0218161 A1   Sep. 11, 2008

(30) Foreign Application Priority Data

Mar. 1, 2007   (JP) .............................. 2007-051251
Jul. 3, 2007    (JP) .............................. 2007-174679

(51) Int. Cl.
*G01B 7/30* (2006.01)

(52) U.S. Cl. ................................. 324/207.25; 324/174

(58) Field of Classification Search ............ 324/207.25, 324/173, 174
See application file for complete search history.

(56) References Cited

U.S. PATENT DOCUMENTS

2007/0139035 A1*   6/2007   Ishii et al. ................... 324/174

FOREIGN PATENT DOCUMENTS

| JP | 2003-279587 | 10/2003 |
|---|---|---|
| JP | 2005-98387 | 4/2005 |
| JP | 2006-220270 | 8/2006 |
| JP | 2006-329660 | 12/2006 |
| JP | 2006-329661 | 12/2006 |
| JP | 2006-329770 | 12/2006 |

* cited by examiner

*Primary Examiner*—Reena Aurora
(74) *Attorney, Agent, or Firm*—McGinn IP Law Group, PLLC

(57) ABSTRACT

A magnetized pulsar ring of the invention is a pulsar ring fixed to an outer peripheral surface of a supporting member and including a ring body in which a number of magnetic poles are at predetermined intervals in a peripheral direction. The ring body 11a is formed of a plastic magnet, and has a cushion member made of an elastic body that is interposed between the ring body and the outer peripheral surface.

7 Claims, 16 Drawing Sheets

(a)

(b)

(a)

(b)

(a)

(b)

(a)

(b)

MAGNETIZED PULSAR RING, AND ROLLING BEARING DEVICE WITH SENSOR USING THE SAME

BACKGROUND OF THE INVENTION

The present invention relates to a magnetized pulsar ring used for detection of the rotational frequency, etc. of a rotary body, and a rolling bearing device with a sensor using the magnetized pulsar ring.

In a rolling bearing device that supports a wheel of an automobile, etc., a sensor for detecting the rotation speed of the wheel is built in order to control an anti-lock brake system, etc. Such a conventional rolling bearing device with a sensor has a magnetized pulsar ring set at an inner shaft (rotating ring), and a magnetic sensor that faces the magnetized pulsar ring, as described in the following JP-A-2006-220270, for example. The above magnetized pulsar ring is attached to the rotating ring so as to be integrally rotatable therewith by mixing magnetic powder, such as ferrite, into an elastic member composed of rubber, etc., and by vulcanizing and adhering the elastic member to an axial outside surface of a rotating-ring-side member (slinger) of a sealing device that seals an annular opening between the inner and outer rings. Further, a plurality of N and S poles are alternately arranged in the magnetized pulsar ring in its peripheral direction. Meanwhile, since the magnetic sensor is provided with a magnetism detecting element, its detection surface is arranged axially outside the rotating ring so as to face a detected surface of the magnetized pulsar ring. Also, the magnetic sensor is configured so as to detect a change in magnetic field from the magnetized pulsar ring according to the rotation of the rotating ring, thereby detecting the rotation speed of the rotating ring.

In the rolling bearing device with a sensor in the above conventional example, there is a case that the magnetized pulsar ring is weak in strength because it is formed of a magnetic material using an elastic body, such as rubber, damage or wear is caused in the magnetized surface of the magnetized pulsar ring due to dust or the like penetrated from the outside, and magnetic properties deteriorate.

For this reason, instead of a magnetic material using an elastic body, such as rubber, it is considered that, for example, a plastic magnet having excellent scratch resistance or wear resistance is used. By using the plastic magnet, deterioration of magnetic properties caused by damage or wear can be suppressed.

On the other hand, the plastic magnet is formed by mixing magnetic powder, such as ferrite, and resin, and thus coefficients of thermal expansion differ largely between the plastic magnet, and a metallic member on the side of the rotating ring to which the magnetized pulsar ring is fixed. Further, the plastic magnet has excellent scratch resistance or wear resistance, as compared with the elastic body, such as rubber, whereas it has high brittleness, and is apt to be damaged by deformation.

For this reason, in a case where the magnetized pulsar ring composed of the plastic magnet is adhered or fixedly press-fitted to a member on the side of the rotating ring, a difference is caused in deformation amount between the magnetized pulsar ring and the member on the side of the rotating ring due to a temperature change, etc. Also, if an excessive deformation stress acts on the magnetized pulsar ring, there is a fear that the magnetized pulsar ring may be damaged.

Another related rolling bearing device with a sensor is shown in FIG. 21 (refer to JP-A-2003-279587).

Referring to FIG. 21, the rolling bearing device with a sensor includes a rolling bearing 141, a sensor unit 142 provided in the rolling bearing, and a magnetized pulsar ring 143 that is a portion to be detected.

The rolling bearing 141 includes an outer ring 144 that is a fixed ring, an inner ring 145 that is a rotating ring, and balls 146 that are a plurality of rolling elements arranged between the outer and inner rings.

The magnetized pulsar ring 143 is composed of a supporting member 147 fixed to the inner ring 145 and a magnetized element 148 provided in the supporting member 147.

The sensor unit 142 has a case 149 fixed to the outer ring 144, and a magnetic sensor 150 fitted into the case 149, and faces the magnetized pulsar ring 143 from the axial outside.

The supporting member 147 of the magnetized pulsar ring 143 includes a cylindrical portion 147a fitted to an outer periphery of the inner ring 145, and an outward flange portion 147b provided at a right end of the cylindrical portion 147a, and rotates relative to the magnetic sensor 150 to thereby cause a change in flux density.

As such a magnetized pulsar ring, there is a pulsar ring of a type that is integrated with a sealing unit. As a rolling bearing device with a sensor using the pulsar ring, as shown in FIG. 22, there is known a rolling bearing device (refer to JP-A-2005-098387) including a rolling bearing 151 having a fixed ring 152, a rotating ring 153, and rolling elements 154 arranged between both the rings 152 and 153, a fixed-side sealing member 155 having a core 156 fixedly fitted to the fixed ring 152 and an elastic seal 157 attached to the core 156, a rotation-side sealing member 158 having a cylindrical portion 159 fixedly fitted to the rotary shaft 153 and a flange portion 160 connected to an axial end of the cylindrical portion 159 and extending toward the fixed-side sealing member 155, a sensor 161 supported on the fixed-side sealing member 155 via resin 162, and a magnetized element 163 provided at a side face of the flange portion 160 of the rotation-side sealing member 158. In this rolling bearing device with a sensor, the rotation-side sealing member 158 and the magnetized element 163 correspond to a magnetized pulsar ring, and there is advantage in that the fixed-side sealing member 155 with the sensor 161, and the rotation-side sealing member 158 (magnetized pulsar ring) with the magnetized element 162 can be assembled (packed) in advance.

In the above magnetized pulsar ring, the magnetized element that is formed as magnetic powder that has rubber as a binder may be damaged due to foreign matters.

Thus, it is considered that scratch resistance is increased using a resin bonded magnet as the magnetized element. However, in a case where the resin bonded magnet is used, the magnet is apt to be split because it is relatively weak in thermal shock and fixation of the magnetized element to the supporting member is difficult.

SUMMARY OF THE INVENTION

The invention has been made in view of such circumstances. It is therefore an object of the invention to provide a magnetized pulsar ring and a rolling bearing device with a sensor using the same, capable of preventing damage caused by a temperature change, and suppressing deterioration of magnetic properties caused by wear or the like of a magnetized surface.

Another object of the invention is to provide a magnetized pulsar ring that uses a resin bonded magnet as a magnetized element to increase scratch resistance, and that improves thermal shock resistance and ensures fixation of the magnetized element in a case where the resin bonded magnet is used.

In order to achieve the above object, the invention provides a magnetized pulsar ring fixed to a fixed surface of a rotary body and including a ring body in which a number of magnetic poles are arrayed at predetermined intervals in a peripheral pulsar. The ring body is formed of a plastic magnet, and has a cushion (buffer) member made of an elastic body interposed between the ring body and the fixed surface.

According to the magnetized pulsar ring configured as described above, the ring body is formed of a plastic magnet. Thus, scratch resistance or wear resistance can be improved as compared with a case where a magnetic material made of, for example, an elastic body, such as rubber, is used. For this reason, deterioration of magnetic properties caused by damage or wear can be suppressed. Moreover, the cushion member is interposed between the pulsar ring and the fixed surface of the rotary body. Thus, even if the rotary body and the ring body is deformed so as to expand or shrink with a temperature change, a difference in deformation amount caused therebetween can be allowed by the cushion member. Accordingly, an excessive deformation stress can be kept from acting on the ring body. As a result, the magnetized pulsar ring including the ring body formed of a relatively brittle plastic magnet can be prevented from being damaged.

Further, in the magnetized pulsar ring according, the ring body is formed with a detent that is fitted into a recess formed in the fixed surface to prevent the relative rotation of the ring body and the rotary body.

In this case, the detent can prevent the relative rotation of the ring body and the rotary body, and can firmly fix the magnetized pulsar ring to the fixed surface so as to be integrally rotatable therewith. Accordingly, even if the cushion member is interposed between the ring body and the fixed surface as described above, the ring body can be firmly fixed to the rotary body so as to be integrally rotatable therewith.

Furthermore, for example, even in a case where the ring body is press-fitted to the rotary body, the magnetized pulsar ring can be firmly fixed to the fixed surface so as to be integrally rotatable therewith, although the ring body is not strongly fixed with high press-fit allowance. For this reason, it is possible to suppress a stress that acts on the ring body with press fitting, and it is possible to more effectively prevent an excessive deformation stress from acting on the magnetized pulsar ring.

Further, in the above magnetized pulsar ring, it is preferable that the detent be a ridge that is formed in a peripheral surface of the ring body, and extends in an oblique direction with respect to an axial direction while protruding radially.

In this case, since the detent is a ridge that extends in an oblique direction with respect to the axial direction, it is possible to prevent the relative rotation of the ring body and the rotary body, and it is possible to prevent the ring body from moving axially.

Further, the invention provides a rolling bearing device with a sensor including a fixed ring and a rotating ring, a rolling element arranged so as to be rollable between the fixed ring and rotating ring, a magnetized pulsar ring fixed to a fixed member fixed to the rotating ring, and a magnetic sensor that detects the magnetism of the magnetized pulsar ring to thereby detect the rotation state of the rotating ring. Here, the magnetized pulsar ring is the magnetized pulsar ring according to Claim 1.

According to the rolling bearing device with a sensor configured as described above, as described above, it is possible to suppress deterioration of magnetic properties caused by damage or wear of the magnetized pulsar ring. Moreover, since the cushion member can keep an excessive deformation stress from acting on the ring body, it is possible to prevent the magnetized pulsar ring from being damaged.

According to the magnetized pulsar ring of the invention, and the rolling bearing device with a sensor using the same, it is possible to prevent damage of the magnetized pulsar ring, and it is possible to suppress deterioration of magnetic properties caused by damage or wear of the magnetized pulsar ring.

A magnetized pulsar ring according to the invention includes a supporting member and a magnetized element fixed to the supporting member via an adhesive layer. The magnetized element is a resin bonded magnet, and at least one of the magnetized element and the supporting member is provided with a projection that specifies the thickness of the adhesive layer.

In the magnetized pulsar ring according to the invention, as the resin bonded magnet, ferrite powder+PPS (polyphenylene sulfide), ferrite powder+PA66 (polyamide resin), rare-earth magnetic powder+PPS, rare-earth magnetic powder+PA66, ferrite powder+rare-earth magnetic powder+PPS, and ferrite powder+rare-earth magnetic powder+PA66, and the like are suitable, and combinations of magnetic powder and resin other than these can also be used. Further, a reinforcing material, such as glass fibers, may be added to resin. As the supporting member, ferritic stainless steel, such as SUS430, is suitable. As the adhesive, a silicon-based adhesive is preferable.

As the magnetized pulsar ring, there is a pulsar ring including a supporting member including a cylindrical portion, and a flange portion provided at one end of the cylindrical portion, and a disk-like magnetized element bonded to the flange portion of the supporting member. Further, as the magnetized pulsar ring, there is a pulsar ring including a disk-like supporting member, and a cylindrical magnetized element engaged with an inner periphery or outer periphery of the supporting member. As the magnetized element, there is a magnetized element fixed to the supporting member after being formed in the shape of a disk or in the shape of a cylinder. Further, as the magnetized element, there is a magnetized element fixed to the supporting member by integral injection molding so that a slip-out preventing portion to be engaged with an outer periphery of the flange portion may be formed at an outer periphery of the magnetized element. As the resin bonded magnet, there is a resin bonded magnet in which N poles and S poles are arrayed at equal intervals by the magnetizing device after being bonded to a supporting member (slinger), or a resin bonded magnet fixed to the supporting member (slinger) via an adhesive layer after being magnetized.

The supporting member is made of metal, such as stainless steel, and thereby, coefficient of linear expansion differ in the resin bonded magnet and the supporting member. Therefore, the deformation amount of the magnetized element and the supporting member vary at the time of thermal expansion or thermal contraction, and consequently, the magnetized element becomes apt to be split by thermal shock. According to the magnetized pulsar ring of this invention, the adhesive layer as an elastic layer is interposed between the magnetized body and the flange portion whereby a difference in deformation amount is absorbed by the adhesive layer. As a result, since the stress generated in the magnetized element becomes small, any damage of the magnetized element is prevented.

Although the projection is provided, for example, only in the magnetized element, the projection may be provided only in the supporting member, or projections may be provided in both the magnetized element and the supporting member. The thickness of the adhesive layer is suitably 10 to 200 µm, and accordingly, the height of the projection is preferably 10 to 200 µm.

The projection may be an annular projection, and may be a plurality of circular or square projections that are arranged at predetermined intervals in the peripheral direction. Even in any case, one projection or a row of projections may be provided in the intermediate portion of the magnetized element or the supporting member, one projection or a row of projections (a total of two or a total of two rows) or may be provided in each of the magnetized element and the supporting member, or three or projections or three or more rows of projections may be provided. In a case where a plurality of projections are provided, they may be provided equal intervals (in the shape of a grid) in the peripheral direction and rear direction, and may not be provided at equal intervals. Further, the projections may have a shape that extends radially, and they may be arranged at equal intervals in the peripheral direction.

The adhesive layer can be only one layer, or can be two or more layers. For example, the adhesive layer may have a two-layer structure that has a first adhesive layer bonded to the supporting member, and a second adhesive layer bonded to the magnetized element. Further, there is an adhesive layer in which an intermediate elastic layer is interposed between the first adhesive layer bonded to the supporting member, and the second adhesive layer bonded to the magnetized element. In this case, a projection provided in the magnetized element is adjusted to the thickness of the second adhesive layer, and a projection provided in the supporting member is adjusted to the thickness of the first adhesive layer. A rubber sheet (rubber layer), a resin sheet (resin layer), an adhesive (adhesive layer), or the like can be used for the intermediate elastic layer. As the material of the rubber layer used as the intermediate elastic layer, a material having excellent thermal resistance is preferable, and NBR (nitrile rubber, HNBR (hydrogenated nitrile rubber), FKM (fluororubber), VMQ (silicone rubber), EPDM (ethylene propylene rubber), and the like can be used.

In a case where the rubber layer is interposed between adhesive layers, the magnetized element may be integrated with the supporting member by insert molding, or may be formed in advance, and then bonded to the supporting member with an adhesive. Further, the step of bonding the rubber layer to the supporting member via the first adhesive layer, and the step of bonding the magnetized element to the rubber layer via the second adhesive layer may be performed separately, or all the bonding may be performed simultaneously, for example, at the time of insert molding. The bonding between the rubber layer and the supporting member and/or the magnetized element may be performed by vulcanization adhesion.

In the magnetized pulsar ring of this invention, a recess having predetermined depth may be provided in the surface of supporting member to which the magnetized element is bonded. In this case, a projection may be provided in the recess, and a projection may also be provided in the magnetized element. This makes it unnecessary to make the magnetized element thin, and reliably prevents deterioration of thermal shock resistance or easy slip-out of the magnetized element. Since the thickness of the adhesive layer is specified by the projection, it is not necessary to adjust the depth of the recess to the thickness of the adhesive layer.

In the magnetized pulsar ring of the invention, preferably, at least one of an edge of the supporting member and an edge of the magnetized element is formed with a recess that accommodates a projecting portion of an adhesive.

If at least one of the supporting member and the magnetized element is coated with an adhesive, and both of them are made to abut against each other, the gap between the surface of the supporting member on which the adhesive is coated, and the surface of the magnetized element on which the adhesive is coated is specified by the projection. In this case, if the amount of the adhesive to be coated is large, portion of the adhesive may protrude from a portion where coating is required. By receiving the projecting portion in the recess, adhesion to portions (an outer peripheral surface of the supporting member, an outer peripheral surface of the magnetized element, and the like) where the adhesive is not required is prevented.

The recess can be formed, for example, by chamfering a corner of the supporting member, and a corner of the magnetized element that faces this corner. Instead of the chamfering (cross-section is substantially triangular), the recess may be formed by a level difference (cross-section is substantially square). Although the shape of the chamfered portion may naturally be a flat oblique surface, the chamfered portion can also be formed as a curved surface. The recess may be provided in either the supporting member or the magnetized element, and may be provided in both of them.

A coefficient-of-linear-expansion adjusting material that brings the coefficient of linear expansion of the magnetized element close to the coefficient of linear expansion of the supporting member may be added to the magnetized element. The coefficient of linear expansion of the magnetized element is preferably 1 to 2 times and more preferably 1 to 1.5 times larger than the coefficient of linear expansion of the supporting member. This reduces a difference in deformation amount between the magnetized element and the supporting member the time of thermal expansion or thermal contraction, and reduces the stress generated in the magnetized element. As the coefficient-of-linear-expansion adjusting material, glass fibers, carbon fibers, or the like is suitable.

Further, a slip-out preventing portion engaged with the outer periphery of the flange portion may be formed at the outer periphery of the magnetized element. This reliably prevents slip-out of the magnetized element that presents a problem in a case where the resin bonded magnet is used.

According to the magnetized pulsar ring of this invention, since the magnetized element is a resin bonded magnet, scratch resistance is increased, and since a difference in deformation amount between the supporting member and the magnetized element can be absorbed by the adhesive layer, thermal shock resistance of the magnetized element improves, and the magnetized element is fixed positively. Also, since the supporting member is provided with the projection that specifies the thickness of the adhesive layer, any deviation in thickness of the adhesive layer can be suppressed, and the magnetized element is fixed positively.

DETAILED DESCRIPTION OF PREFERRED EMBODIMENTS

First Embodiment

Figure 1:
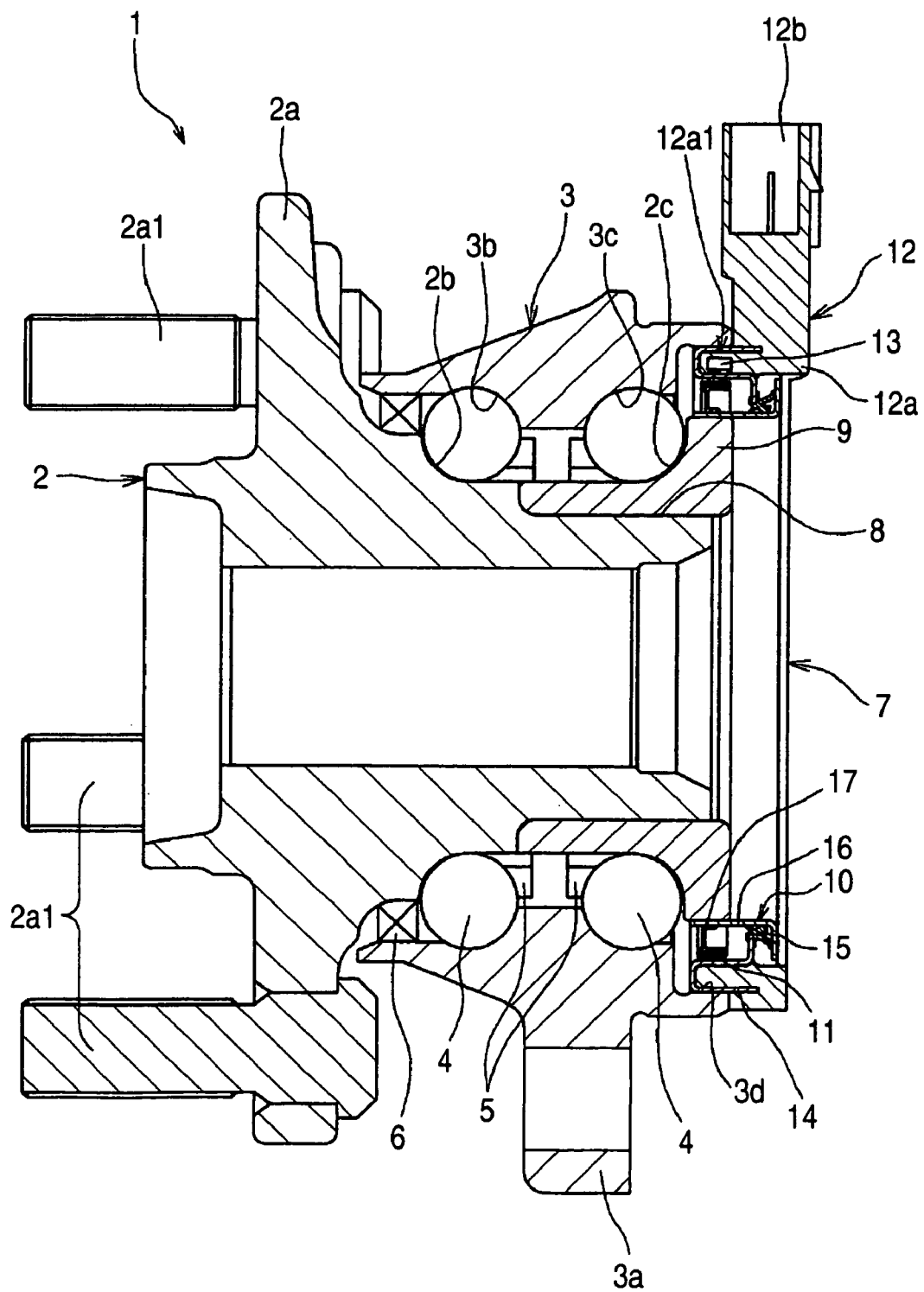
FIG. 1 is a sectional view showing the configuration of a rolling bearing device with a sensor including a magnetized pulsar ring according to a first embodiment of the invention.

Next, preferable embodiments of the invention will be explained referring to the accompanying drawings. FIG. 1 is a sectional view showing the configuration of a rolling bearing device with a sensor including a magnetized pulsar ring according to a first embodiment of the invention. This rolling bearing device 1 with a sensor rotatably supports wheels of a vehicle, such as an automobile, to a suspension system.

Referring to FIG. 1, the rolling bearding device 1 with a sensor constitutes a plurality of rows of angular ball bearings, and includes an inner shaft 2 that has a flange portion 2a to which a wheel (not shown) is to be attached at its one end, an outer ring 3 arranged concentrically at an outer periphery of the inner shaft 2, a plurality of balls 4 serving as rolling elements that are interposed between the inner shaft 2 and the outer ring 3, and a cage 5 that holds these balls 4 at equal intervals in a peripheral direction. Further, the rolling bearing device 1 with a sensor further includes a seal 6 that seals an annular gap between the inner shaft 2 and the outer ring 3 at one axial end, and a sensor unit 7 having a function as a seal that seals an annular gap at the other axial end.

The outer ring 3, which is a fixed ring fixed to the vehicle, has a mounting flange 3a for attachment to the suspension system of the vehicle formed at its outer peripheral surface. Further, the outer ring has first and second outer ring raceways 3b and 3c along which the balls 4 roll formed at its inner peripheral surface.

The inner shaft 2 is an axle to which a wheel is attached, and constitutes a rotating ring of the rolling bearing device 1 with a sensor. A plurality of hub bolts 2a1 for fixing the wheel to the flange portion 2a are fixed to the flange portion 2a formed at one end of the inner shaft 2. Further, a first inner ring raceway 2b that faces the first outer ring raceway 3b is formed at the outer peripheral surface of the inner shaft 2. A small diameter portion 8 having a smaller diameter than the outer peripheral surface of the inner shaft 2 is formed at the other end of the inner shaft 2. An annular inner ring member 9 having a second inner ring raceway 2c that faces the second outer ring raceway 3c formed at its outer peripheral surface is externally fitted to the small diameter portion 8.

A plurality of the balls 4 are rollably arranged between the first inner ring raceway 2b and the first outer ring raceway 3b and between the second inner ring raceway 2c and the second outer ring raceway 3c, respectively.

By the above configuration, the rolling bearing device 1 with a sensor supports the inner shaft 2 rotatably with respect to the outer ring 3, and rotatably supports the wheel fixed to the inner shaft 2.

The sensor unit 7 that seals the annular gap between the inner shaft 2 and the outer ring 3 has an annular slinger 10 that is externally fitted and fixed to the outer peripheral surface of the inner ring member 9, an annular magnetized pulsar ring 11 integrally rotatably fixed to the slinger 10, and a main body 12 internally fitted and fixed to an inner peripheral surface 3d of the outer ring 3 at the other end, and provided with a magnetic sensor 13.

The main body 12 has an annular portion 12a annularly formed of resin, etc. and having the magnetic sensor 13 buried therein, an annular core 14 fixed to the annular portion 12a, and a connector 12b formed to protrude radially outward from the annular portion 12a. Harness from a control device of the vehicle on which the rolling bearing device 1 with a sensor is carried is connected to the connector 12b, and is configured so that the detected signal of the magnetic sensor 13 can be output to the control device.

Further, the annular portion 12a is formed with a protruding portion 12a1 protruding toward one axial end along a peripheral edge of an inner diameter end thereof, and the core 14 is fixed along the inner and outer peripheral surfaces and end face of the protruding portion 12a1.

The core 14 is formed by press-working cold-rolled sheet steel, such as SPCC, SPCD, or SPCE, and a sealing member 15 for sealing a gap between the slinger 10 and the main body 12 is fixed to an inner peripheral end of the core by vulcanization adhesion, etc.

Further, the above-mentioned magnetic sensor 13 is buried and arranged inside the protruding portion 12a1 of the main body 12. The magnetic sensor 13 detects a change in magnetic pole caused as the magnetized pulsar ring 11 to be described below rotates integrally along with the inner shaft 2, and outputs the detected signal.

The slinger 10 has a main body 16 externally fitted to the inner ring member 9 and formed in an L-shape in cross section, and an annular supporting member 17 that is externally fitted and fixed to the outer peripheral surface of the main body 16, and supports the magnetized pulsar ring 11 at an outer periphery thereof.

Figure 2:
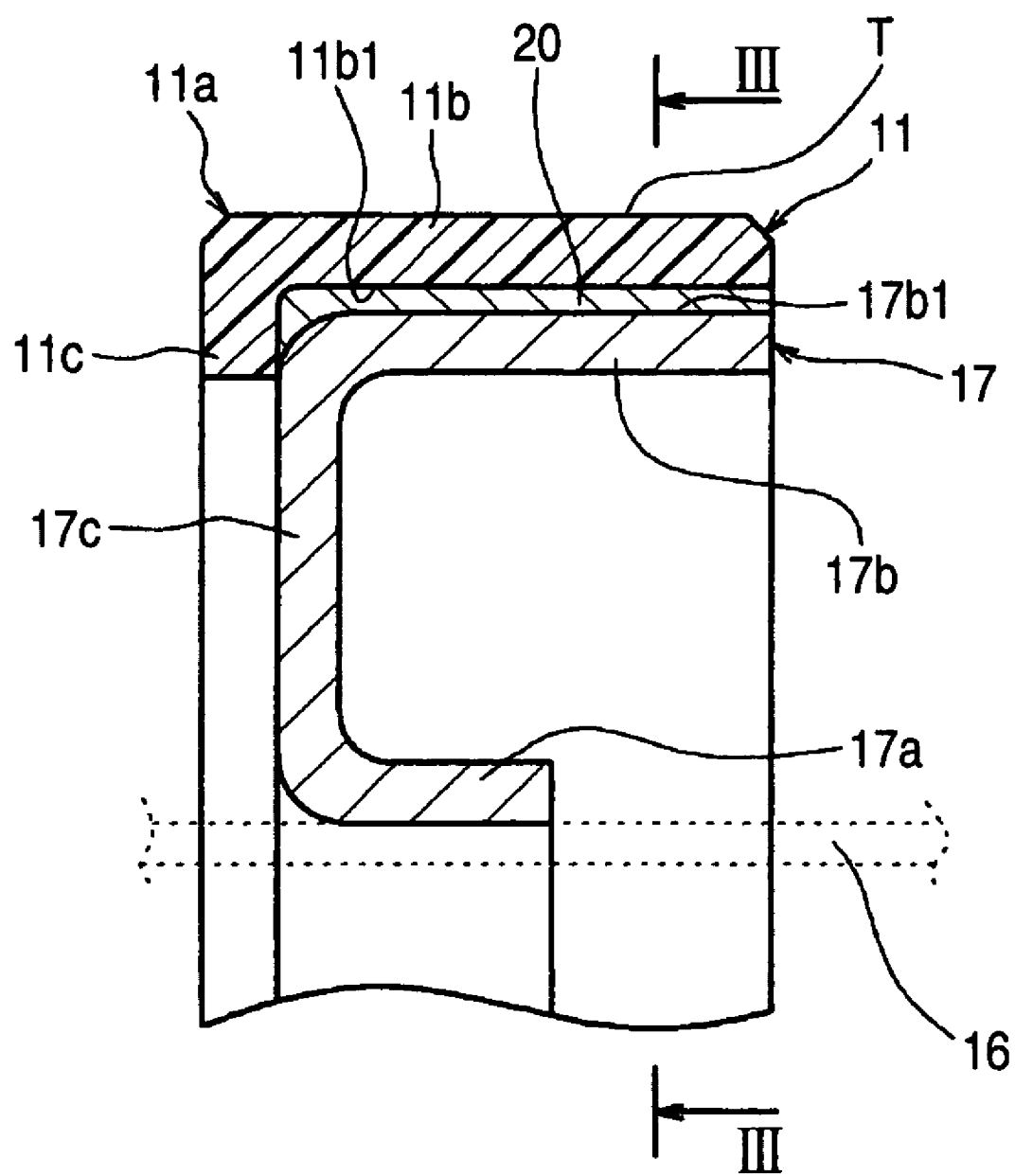
FIG. 2 is a sectional view showing only the magnetized pulsar ring and a supporting member in an enlarged manner.

FIG. 2 is a sectional view showing only the magnetized pulsar ring 11 and the supporting member 17 in an enlarged manner. The supporting member 17 has an inner tubular portion 17a that is fixed to the main body 16 so as to be arranged at an inner periphery of the core 14 (FIG. 1) and is externally fitted to the outer peripheral surface of the main body 16, an outer tubular portion 17b arranged at an outer periphery of the inner tubular portion 17a, and an annular portion 17c that connects the portions of the tubular portions 17a and 17b on their axial one side, and is thereby formed in a U-shape in cross section.

The main body 16 and the supporting member 17 of the slinger 10 are formed by press-working cold-rolled sheet steel, such as SPCC, SPCD, or SPCE, similarly to the core 14.

The magnetized pulsar ring 11 fixed to an outer peripheral surface 17b1 of the supporting member 17 includes a ring body 11a formed annularly using a plastic magnet, and the ring body 11a has a tubular portion 11b arranged at an outer peripheral surface of the outer tubular portion 17b of the supporting member 17, and an edge 11c extending along the annular portion 17c radially inward from an end of the tubular portion 11b. The ring body 11a is press-fitted to the outer peripheral surface 17b1 of the outer tubular portion 17b via a cushion (buffer) member 20 to be described. Further, the ring body 11a is press-fitted in a state where the edge 11c abuts against the annular portion 17c of the supporting member 17, and thereby, is positioned axially with respect to the supporting member 17 of the ring body 11a.

The plastic magnet that constitutes the ring body 11a is obtained, for example, by mixing ferrite powder as magnetic powder with polyphenylene sulfide (FPS) resin, polyamide (PA) resin, or the like, and thereafter, forming the mixture into a predetermined shape. In this way, since the plastic magnet has the above resin or the like as a binder, the plastic magnet has excellent scratch resistance or wear resistance, as compared with a magnetic material that has an elastic member, such as rubber, as the binder.

Further, in the magnetic powder included in the plastic magnet that constitutes the magnetized pulsar ring 11 of this embodiment, its magnetic field may be aligned in a predetermined direction. In this case, it is possible to obtain better magnetic properties.

At the outer peripheral surface of the tubular portion 11b, a number of magnetic poles are arrayed at predetermined intervals in the peripheral direction. That is, the outer peripheral surface of the tubular portion 11b is magnetized so that N poles and S poles may be alternately arrayed at predetermined intervals, and thereby constitutes a magnetized surface T. Further, the tubular portion 11b is arranged so as to face the inner peripheral surface of the core 14 with a slight gap therefrom, and is arranged inside the magnetic sensor 13 buried in the protruding portion 12a1 of the main body 12 (refer to FIG. 1). For this reason, the magnetized pulsar ring 11 that rotates integrally with the inner shaft 2 can change the magnetic poles with respect to the magnetic sensor 13 according to the rotation of the inner shaft 2. The magnetic sensor 13 detects a change in the magnetic pole of the magnetized surface T that changes according to the rotation of the inner shaft 2, and outputs the detected signal to the control device of the vehicle. The control device recognizes the rotation speed of the inner ring 2 on the basis of the detected signal of the magnetic sensor 13, and reflects the speed in the control of an anti-lock brake system, etc. of the vehicle.

Figure 3:
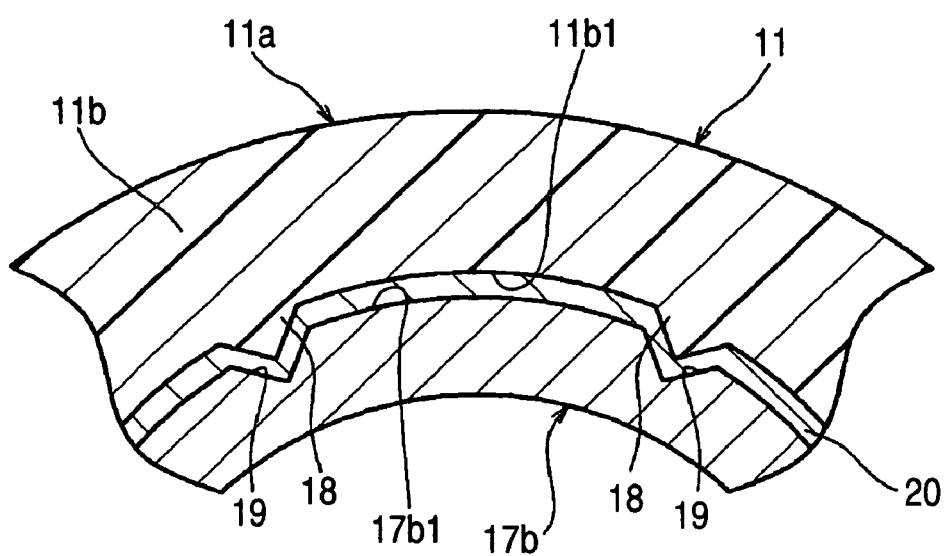
FIG. 3A is a sectional view taken along the line III-III in FIG. 2.
FIG. 3B is an appearance view when an inner peripheral surface of the magnetized pulsar ring is seen from the front.
Figure 3:
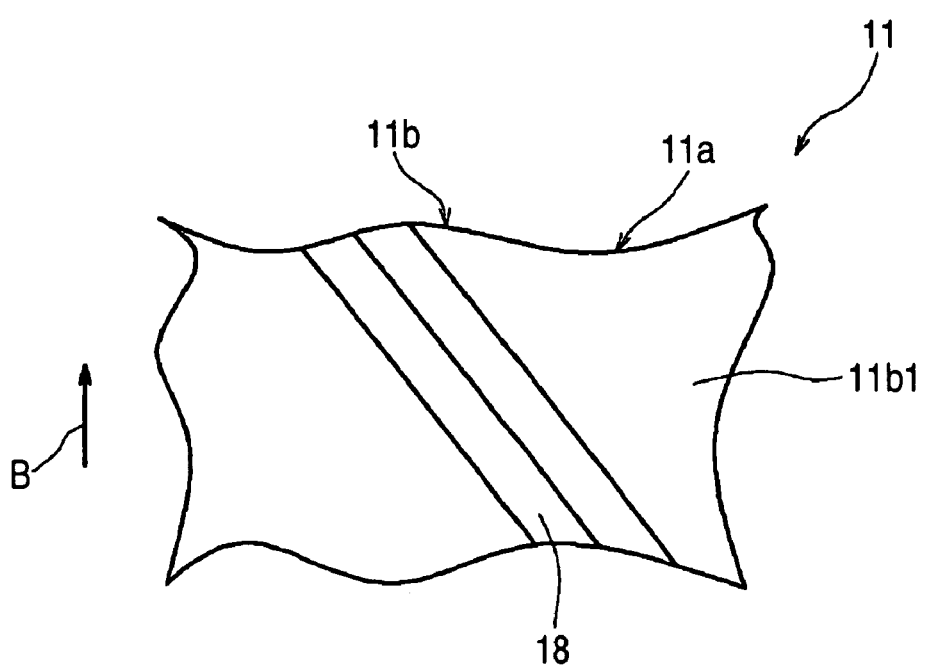

FIG. 3A is a sectional view taken along the line III-III in FIG. 2, and FIG. 3B is an appearance view when the inner peripheral surface of the magnetized pulsar ring 11 is seen from the front. In these figures, a plurality of ridges 18 that protrudes radially inward are formed at an inner peripheral surface 11b1 of the tubular portion 11b. The ridges 18 have a substantially wedged cross-section, are formed so as to extend in an oblique direction with respect an arrow B indicating the axial direction in FIG. 3B, and are arranged at predetermined intervals in the peripheral direction.

Further, grooves 19 as recesses into which the ridges 18 are fitted are formed at the outer peripheral surface 17b1 of the outer tubular portion 17b.

In this way, the ridges 18 formed on the ring body 11a are fitted into the grooves 19 formed in the outer peripheral surface 17b1, thereby constituting a detent that prevents the relative rotation between the ring body 11a, and the supporting member 17 that rotates integrally with the inner shaft 2.

Further, since the ridges 18 are formed at the inner peripheral surface 11b1 of the tubular portion 11b, and are formed so as to extend in an oblique direction with respect to the axial direction, it is also possible to prevent the ring body 11a from axially moving relative to the supporting member 17.

Further, as shown in FIG. 3A, the ring body 11a is fixed by interposing the cushion member 20 made of an elastic body, such as rubber, between the ring body and the outer peripheral surface 17b1 of the outer tubular portion 17b that is a surface to be fixed. This cushion member 20 is interposed between both of them so as to extend along the inner peripheral surface 11b1 of the tubular portion 11.

For this reason, the cushion member 20 is interposed even between the ridges 18 and the grooves 19. Further, as described above, the ring body 11a is fixedly press-fitted to the outer peripheral surface 17b1 of the outer tubular portion 17b with the cushion member 20 interposed. However, the ridges 18 are formed in an oblique direction with respect to the axial direction. Thus, when the ring body 11a is press-fitted to the outer peripheral surface 17b1, the press-fit can be made by screwing the ring body 11a into the outer tubular portion 17b so that the ridges 18 and the grooves 19 may be made to coincide with each other.

As described above, the press-fitted ring body 11a is formed with the ridges 18. Thus, even if the ring body 11a is not strongly fixed to the outer peripheral surface 17b1 with large press-fit allowance, the relative rotation therebetween can be prevented, and the ring body 11a can be firmly fixed to the supporting member 17 so as to be integrally rotatable therewith.

In the magnetized pulsar ring 11 of this embodiment configured as described above, coefficients of thermal expansion may differ largely between the supporting member 17 on the side of the slinger 10 made of a steel plate, and the magnetized pulsar ring 11 made of a plastic magnet that has resin as a binder. When these are deformed so as to expand or shrink with a temperature change, a difference in deformation amount is caused between the supporting member 17 and the magnetized pulsar ring 11 press-fitted thereto. However, according to the magnetized pulsar ring 11 of this embodiment, the cushion member 20 is interposed between the pulsar ring and the outer peripheral surface 17b1. Thus, even if the supporting member 17 and the ring body 11a is deformed so as to expand or shrink with a temperature change, a difference in deformation amount caused therebetween can be allowed by the cushion member 20. Accordingly, an excessive deformation stress can be kept from acting on the ring body 11a, and the magnetized pulsar ring 11 including the ring body 11a formed of a relatively brittle plastic magnet can be prevented from being damaged by a deformation stress caused by a temperature change, etc.

Further, even in a case where the supporting member 17 and the magnetized pulsar ring 11 have been deformed in directions away from each other due to a difference in coefficient of thermal expansion, the cushion member 20 interposed between the magnetized pulsar ring 11 and the supporting member 17 can prevent a gap from being created therebetween, and can prevent can prevent foreign matters from entering a gap therebetween. As a result, deterioration, etc. of the magnetized pulsar ring 11 can be prevented.

Further, in the magnetized pulsar ring 11 of this embodiment, the ring body 11a is formed of a plastic magnet. Thus, scratch resistance or wear resistance can be improved as compared with a case where a magnetic material made of, for example, an elastic body, such as rubber, is used. For this reason, deterioration of magnetic properties caused by damage or wear of the magnetized pulsar ring 11 can be suppressed.

As described above, the magnetized pulsar ring 11 of this embodiment can be prevented from being damaged by a deformation stress caused by a temperature change, etc., and can suppress deterioration of magnetic properties caused by wear of a magnetized surface, etc.

Further, according to the rolling bearing device 1 with a sensor having the above configuration, it is possible to prevent the magnetized pulsar ring 11 from being damaged by a deformation stress caused by a temperature change, etc., and it is possible to suppress deterioration of magnetic properties caused by wear or the like of the magnetized surface of the magnetized pulsar ring 11.

Further, in the above embodiment, the ridges 18 that can firmly fix the ring body 11a to the supporting member 17 so as to be integrally rotatable therewith are formed at the ring body 11a press-fitted to the supporting member 17. Thus, it is not necessary to strongly fix the ring body 11a to the outer peripheral surface 17b1 with large press-fit allowance. For this reason, it is possible to suppress a stress that acts on the ring body with press fitting, and it is possible to more effectively prevent an excessive deformation stress from acting on the magnetized pulsar ring.

In the above embodiment, the magnetized pulsar ring 11 is fixedly press-fitted in a state where the cushion member 20 is interposed between the pulsar ring and the outer peripheral surface 17b1 of the supporting member 17. However, the supporting member 17 and the cushion members 20, and the cushion member 20 and the magnetized pulsar rings 11 can also be fixed to each other by joining gaps therebetween with an adhesive, etc.

Further, in the above embodiment, the cushion member 20 is also interposed between the ridges 18 and the grooves 19. However, for example, by providing slits in the portions of the cushion member 20 where the ridges 18 and the grooves 19 are located, the cushion member 20 may not be interposed therebetween.

Further, in the above embodiment, the ridges 18 are formed on the tubular portion 11b, and the grooves 19 into which the ridges 18 are fitted are formed in the outer tubular portion 17b. However, for example, the ridges may be formed on the outer tubular portion 17b, and the grooves into which the ridges are fitted may be formed in the tubular portion 11b.

Figure 4:
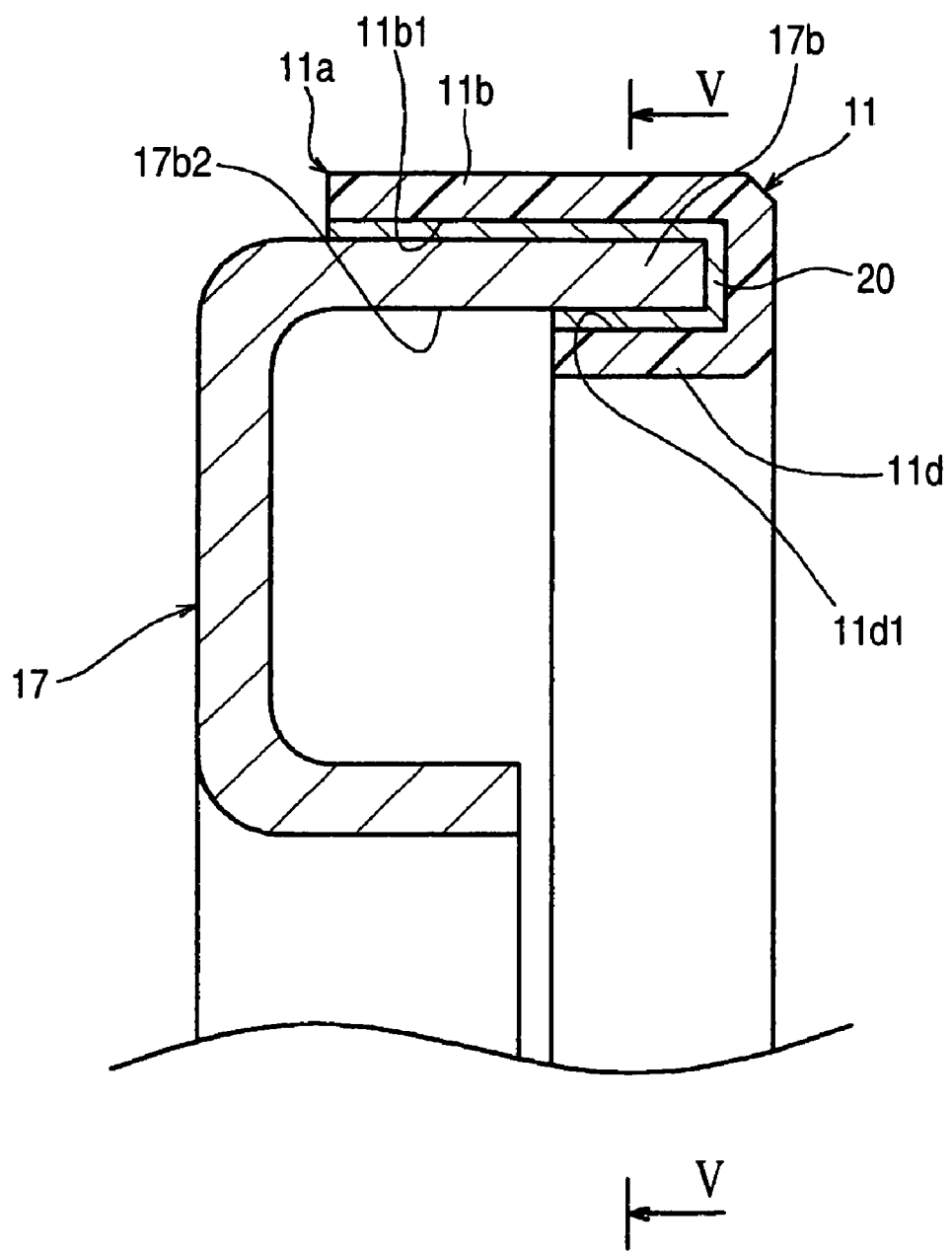
FIG. 4 is a sectional view showing another aspect when a ring body is press-fitted to a supporting member, in the magnetized pulsar ring.

Further, as shown in FIG. 4, for example, the shape of the ring body 11a of the magnetized pulsar ring 11 can be a U-shaped section that covers the end of the outer tubular portion 17b of the supporting member 17, and an inner tubular portion 11d provided in the tubular portion 11b so as to be located at an inner periphery of the outer tubular portion 17b can also be press-fitted to an inner peripheral surface 17b2 of the outer tubular portion 17b of the supporting member 17.

Figure 5:
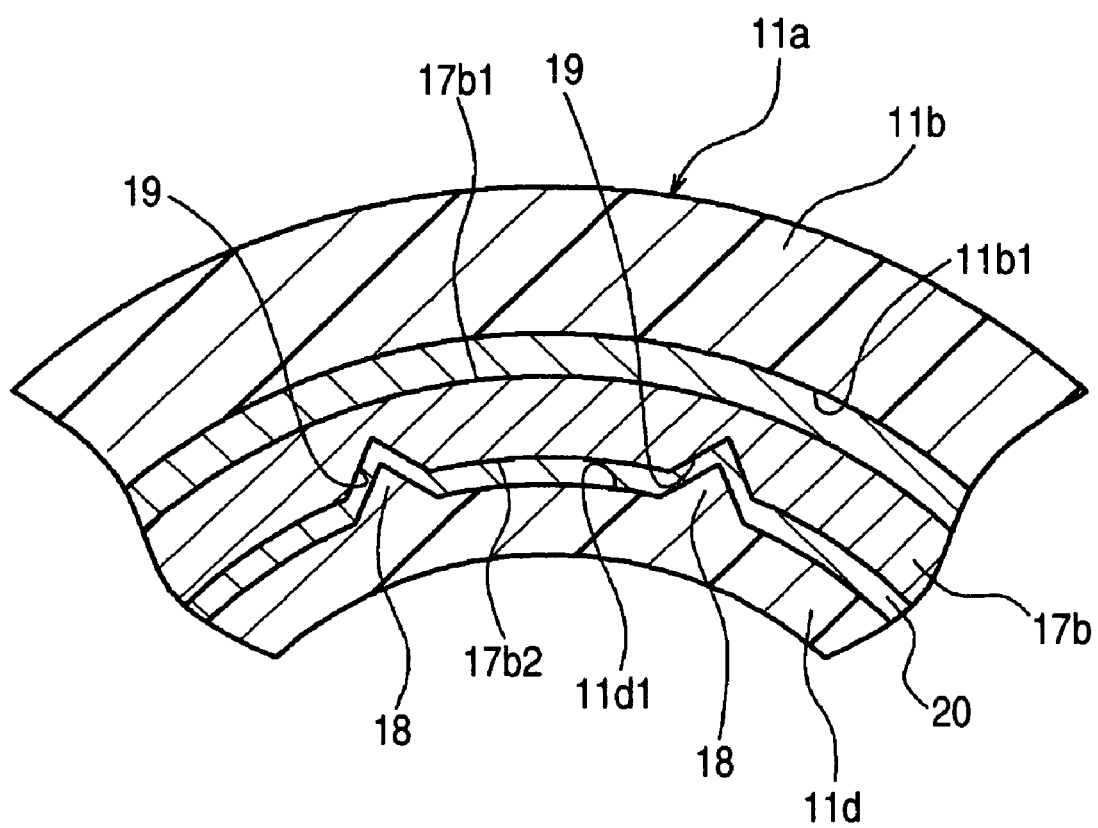
FIG. 5 is a sectional view taken along the line V-V in FIG. 4.

FIG. 5 is a sectional view taken along the line V-V in FIG. 4. In this case, the ridges 18 are provided on an outer peripheral surface 11d1 of the inner tubular portion 11d so as to protrude radially outward, and so as to extend in an oblique direction with respect to the axial direction, similarly to those shown in FIGS. 2 and 3. The grooves 19 are formed in an inner peripheral surface 17b2 of the outer tubular portion 17b. The cushion member 20 is arranged so as to extend along the inner peripheral surface 11b1 of the tubular portion 11b and the outer peripheral surface 11d1 the inner tubular portion 11d, and is interposed between the ring body 11a and the outer tubular portion 17b.

In this way, even in a case where the ring body 11a is press-fitted to the inner peripheral surface 17b2 of the supporting member 17, a difference in deformation amount caused between the supporting member 17 and the ring body 11a can be allowed.

Second Embodiment

Figure 6:
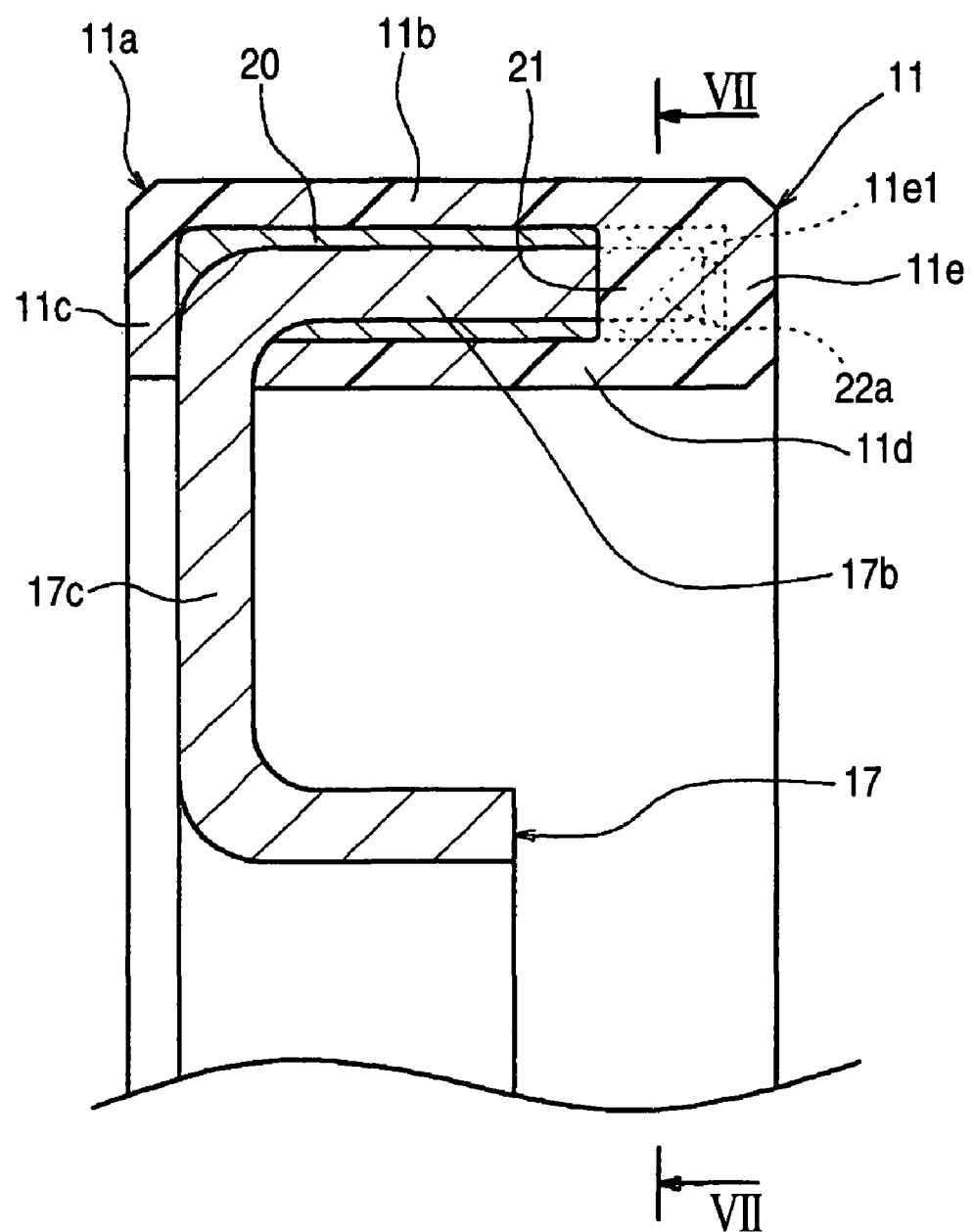
FIG. 6 is a sectional view of a magnetized pulsar ring according to a second embodiment of the invention.

FIG. 6 is a sectional view of a magnetized pulsar ring 11 according to a second embodiment of the invention. The main difference between this embodiment and the first embodiment is that the ring body 11a is insert-molded in the shape of covering the supporting member 17, and instead of the ridges, protruding portions 21 that protrude axially, and prevents any rotation relative to the supporting member 17 is provided on the ring body 11a. Since other configurations of the second embodiment are the same as those of the first embodiment, the description thereof is omitted.

As described above, the ring body 11a of this embodiment is formed in a U-shape in cross section so as to cover the outer tubular portion 17b of the supporting member 17 by so-called insert molding, and has the tubular portion 11b located at the outer peripheral surface of the outer tubular portion 17b of the supporting member 17, the edge 11c extending radially inward along the annular portion 17c from one end of the tubular portion 11b, and the inner tubular portion 11d located at the inner periphery of the outer tubular portion 17b, and a connecting portion 11e that connects the end face of the tubular portion 11d, and the other end face of the tubular portion 11b. The edge 11c and the connecting portion 11e that are provided at both ends of the tubular portion 11b are formed so as to abut against the annular portion 17c and the end face of the outer tubular portion 17b, thereby regulating the axial movement of the ring body 11a.

The above-described protruding portions 21 are provided on an internal surface 11e1 of the connecting portion 11e so as to protrude axially from the internal surface 11e1. FIG. 7A is a sectional view taken along the line VII-VII in FIG. 6, and FIG. 3B is a partial appearance view showing a portion of the supporting member 17.

As shown in FIG. 7B, cutouts 22 are formed in the end face of the outer tubular portion 17b by cutting out the end face at predetermined intervals in the peripheral direction.

As shown in FIG. 7A, the protruding portions 21 axially protrude so as to be in a state of being fitted into the cutouts 22 of the outer tubular portion 17b, and abut against walls 22a of the cutouts 22. By providing the protruding portions 21 that abut against the walls 22a in this way, it is possible to prevent the magnetized pulsar ring 11 and the supporting member 17 from moving radially relative to each other.

Further, even in this embodiment, the cushion member 20 is arranged so as to be interposed between the ring body 11a and the supporting member 17. In this embodiment, the ring body 11a is insert-molded. Thus, it is necessary to adopt the following methods in order to arrange the cushion member 20 between the ring body 11a and the supporting member 17. That is, first, the cushion member 20 is arranged in a predetermined position of an external surface of the outer tubular portion 17b of the supporting member 17, and then, the ring body 11a is insert-molded. This enables the cushion member 20 to be interposed between the insert molded ring body 11a and the supporting member 17.

As described above, even in the magnetized pulsar ring 11 of this embodiment, a plastic magnet is used for the ring body 11a, and the cushion member 20 is arranged so as to be interposed between the ring body 11a and the supporting member 17, it is possible to prevent any damage by a deformation stress caused by a temperature change, etc., and it is possible to prevent deterioration of magnetic properties caused by wear of a magnetized surface, etc.

Moreover, since the ring body 11a of the magnetized pulsar ring 11 of this embodiment is formed by insert molding, the process of press-fitting the ring body 11a to the supporting member 17 is not required, and the cost can be reduced.

Figure 8:
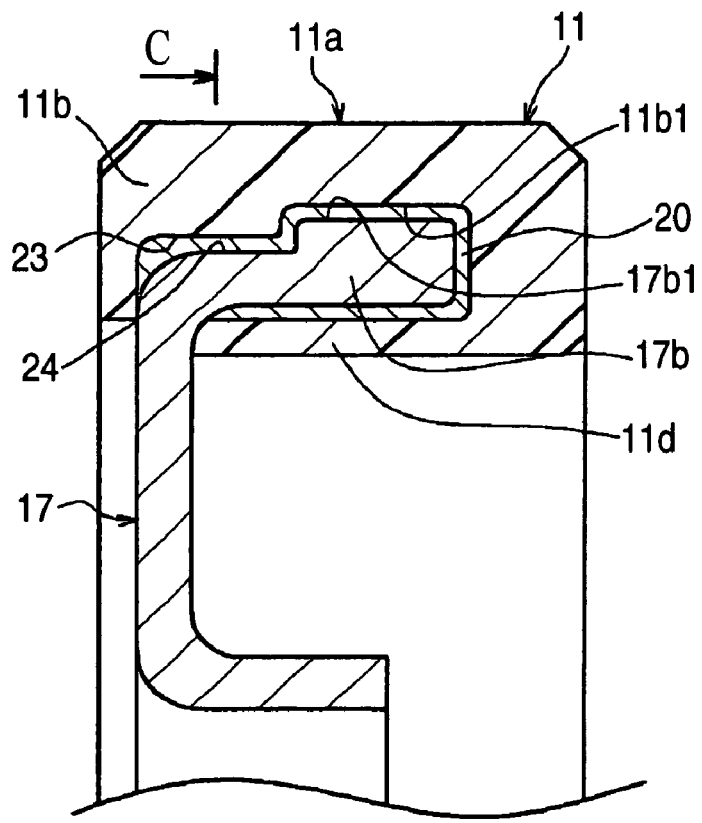
FIG. 8A is a sectional view showing another aspect when a ring body is insert-molded into the supporting member, in the magnetized pulsar ring.
FIG. 8B is a sectional view taken along the line C-C in FIG. 8A.
Figure 8:
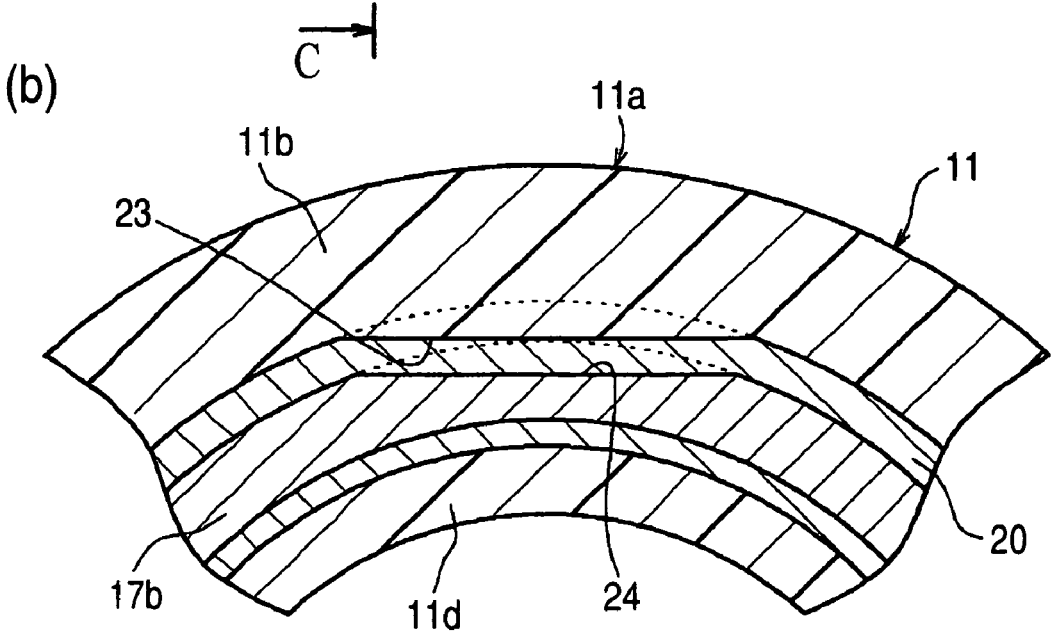

Further, in the above embodiment, the protruding portions 21 fitted into the cutouts 22 are provided at the ring body 11a in order to prevent the rotation of the ring body 11a relative to the supporting member 17. Instead of this, however, as shown in FIGS. 8A and 8B, a flat portion 23 formed flat on the inner peripheral surface 11b1 of the tubular portion 11b may be provided. The flat portion 23 is formed so as to coincide with a flat portion 24 formed at the outer peripheral surface of the outer tubular portion 17b of the supporting member 17, and can prevent the rotation of the ring body 11a relative to the supporting member 17 similarly to the protruding portions 21.

Figure 7:
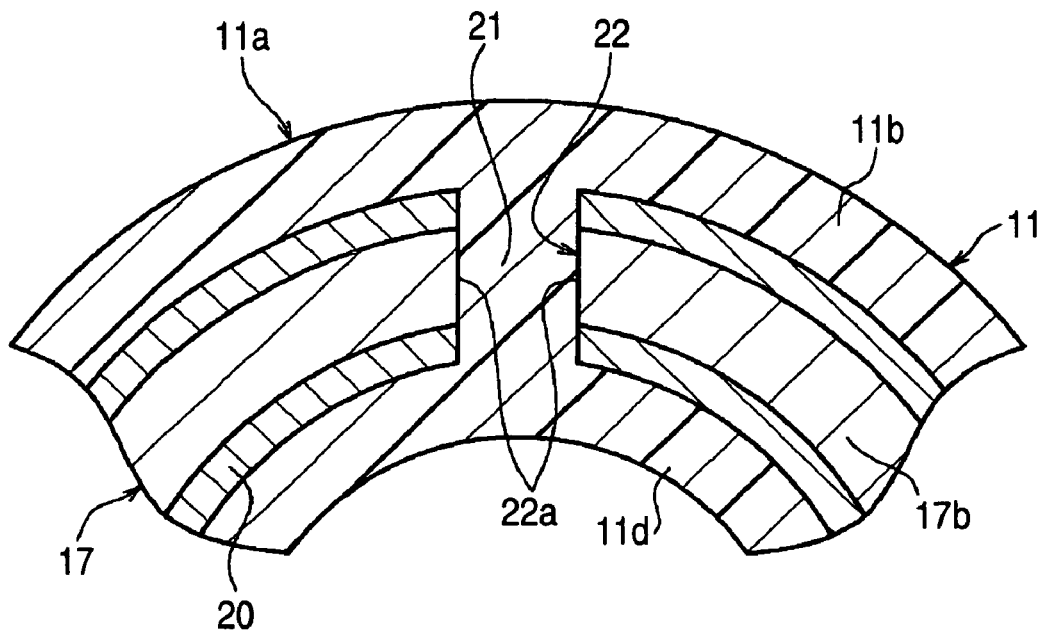
FIG. 7A is a sectional view taken along the line VII-VII in FIG. 6.
FIG. 7B is a partial appearance view showing a portion of the supporting member.
Figure 7:
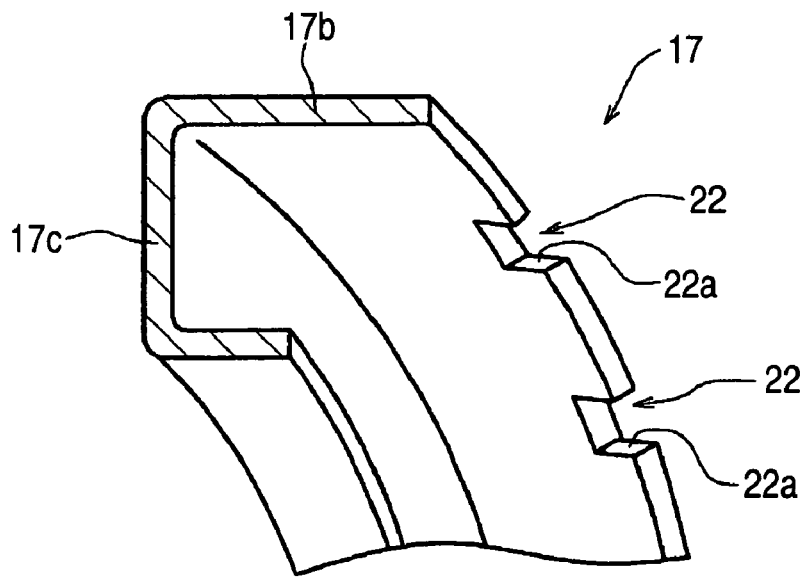

Further, the flat portion 24 formed in the supporting member 17 in correspondence with the flat portion 23 has a simple shape and easy workability as compared with the cutouts 22 shown in FIG. 6 and FIG. 7.

The invention is not limited to the above respective embodiments. In the above embodiment, a configuration in which the magnetized surface of the magnetized pulsar ring 11 is arranged at a peripheral surface, and the magnetic sensor is arranged in the radial direction is illustrated. However, the invention can also be applied to, for example, a configuration in which the magnetized surface as shown in FIGS. 9A and 9B is arranged at the end face of the slinger, and the magnetic sensor 13 is arranged in the thrust direction.

Figure 9:
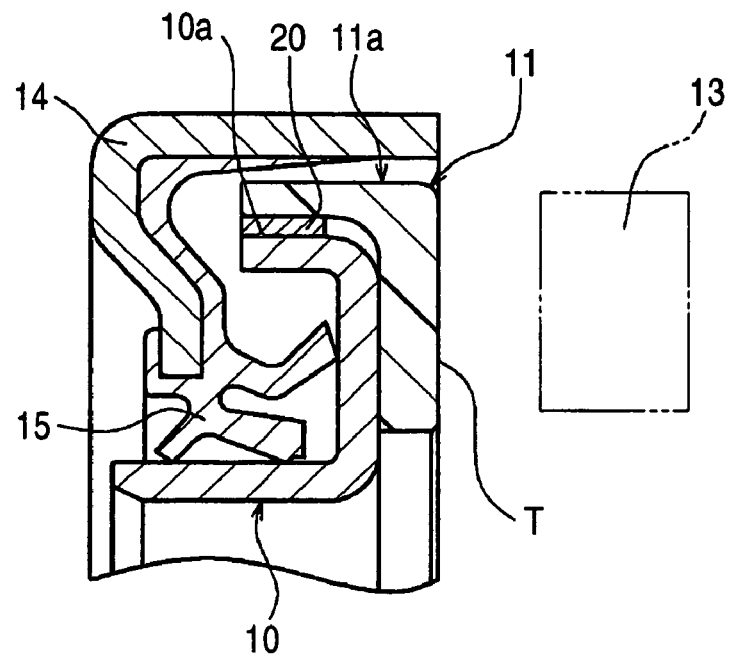
FIG. 9A is a sectional view showing an aspect in which the invention is applied to a magnetized pulsar ring in which a magnetic sensor is arranged in a thrust direction.
FIG. 9B is a sectional view showing another aspect from that of FIG. 9A.
Figure 9:
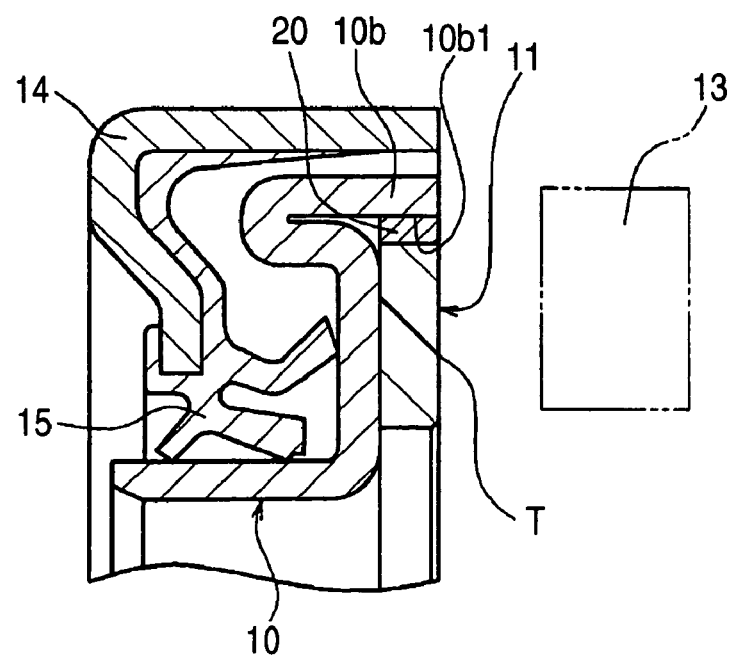

The magnetized pulsar ring 11 shown in FIG. 9A includes the ring body 11a that is annularly formed in an L-shape in cross section, and that has the magnetized surface T at its axial end face, and is fixedly and externally fitted to the outer peripheral surface 10a of the slinger 10 that constitutes a sealing device along with the core 14 that has the sealing member 15 with the cushion member 20 interposed between the pulsar ring and the slinger. Further, the magnetized pulsar ring 11 shown in FIG. 9B includes the ring body 11a that is annularly formed in a rectangular shape in cross section, and that has the magnetized surface T at its axial end face, and is fixedly and internally fitted to an inner peripheral surface 10b1 of an annular projection 10b provided in the slinger 10 with the cushion member 20 interposed between the pulsar ring and the slinger. Thus, even in the magnetized pulsar ring in which a magnetic sensor is arranged in the thrust direction, the cushion member 20 can be arranged can be interposed between the pulsar ring and the slinger as a rotary body.

Further, in the above respective embodiments, a case where ferrite powder is used as the magnetic powder used for the plastic magnet that constitutes the ring body 11a is illustrated. However, magnetic powder of a rare earth system, such as neodymium or samarium, can also be used. In this case, the magnetized pulsar ring can give high magnetism.

Further, in the above respective embodiments, the ridges, the protruding portions, and the flat portion are illustrated as the detent. The detent is not limited thereto.

Third Embodiment

Third embodiment of the invention will be described. In the following description, right and left are defined as the right and left of FIG. 10 and respective drawings corresponding thereto.

Figure 10:
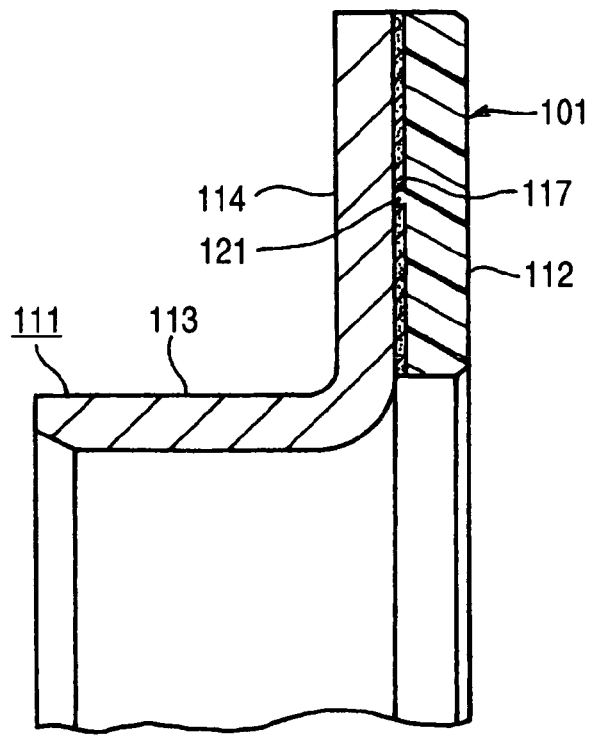
FIG. 10 is a sectional view showing a third embodiment of a magnetized pulsar ring according to the invention.
Figure 11:
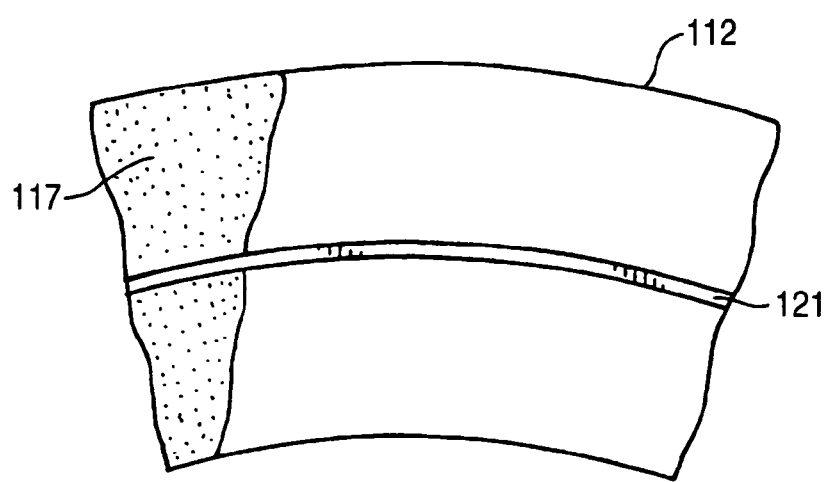
FIG. 11 is a side view of principal parts.

FIGS. 10 and 11 show a third embodiment of a magnetized pulsar ring according to the invention.

Referring to FIG. 10, a magnetized pulsar ring 101 includes a supporting member 111 fixed to the inner ring, and a magnetized element 112 provided in the supporting member 111.

The supporting member 111 includes a cylindrical portion 113 fitted to an outer periphery of the inner ring, and an outward flange portion 114 provided at a right end of the cylindrical portion 113.

The magnetized element 112 is a resin bonded magnet, and is fixed to the whole periphery of a right surface of the flange portion 114 of the supporting member 111 via an adhesive layer 117.

The adhesive layer 117 absorbs the difference between the deformation amount of the magnetized element 112, and the deformation amount of the supporting member 111, and, thereby, the stress generated in the magnetized element 112 becomes small. The thickness of the adhesive layer 117 is preferably 10 to 200 μm, and a projection 121 that specifies the thickness of the adhesive layer 11 is provided on a left surface (adhesive coating surface) of the magnetized element 112. The projection 121 is annularly continuously formed in a radial intermediate portion of the magnetized element 12, and the height thereof is set to 10 to 200 μm. Accordingly, by adjusting the thickness of the adhesive layer 111 to the height of the projection 121, the proper thickness of the adhesive layer 111 can be secured with high precision, and the magnetized element 112 can be fixed positively.

Figure 12:
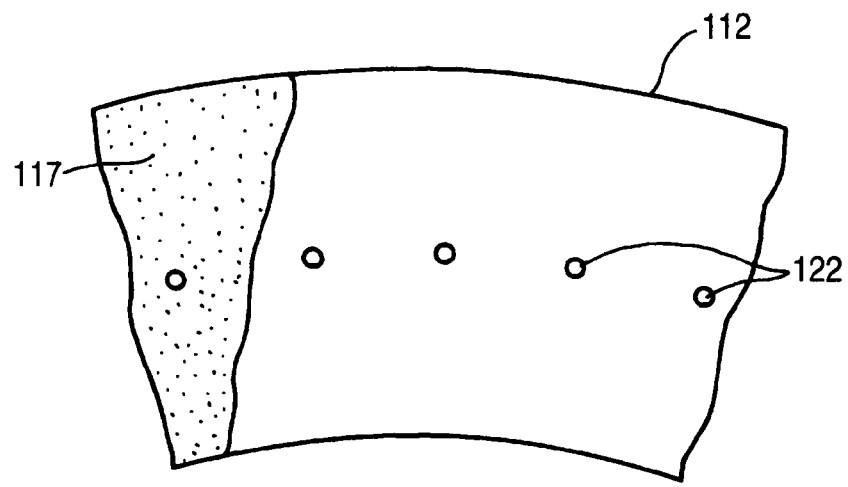
FIG. 12 is a side view of principal parts showing a modified example of the third embodiment.

The projection 121 of the embodiment shown in FIG. 10, as shown in FIG. 12, may be formed in the radial intermediate portion of the magnetized element 112 at predetermined intervals as a plurality of point-like projections 122.

Fourth Embodiment

Figure 13:
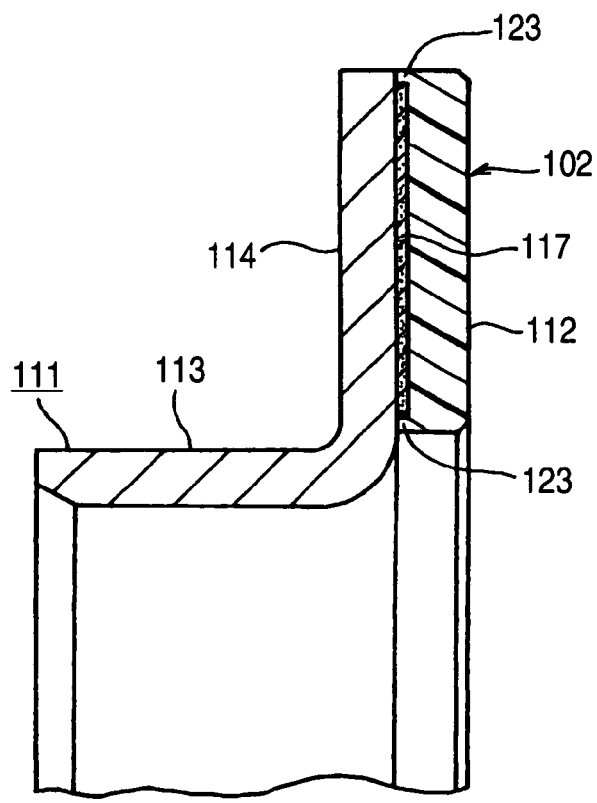
FIG. 13 is a sectional view showing a fourth embodiment of the magnetized pulsar ring according to the invention.
Figure 14:
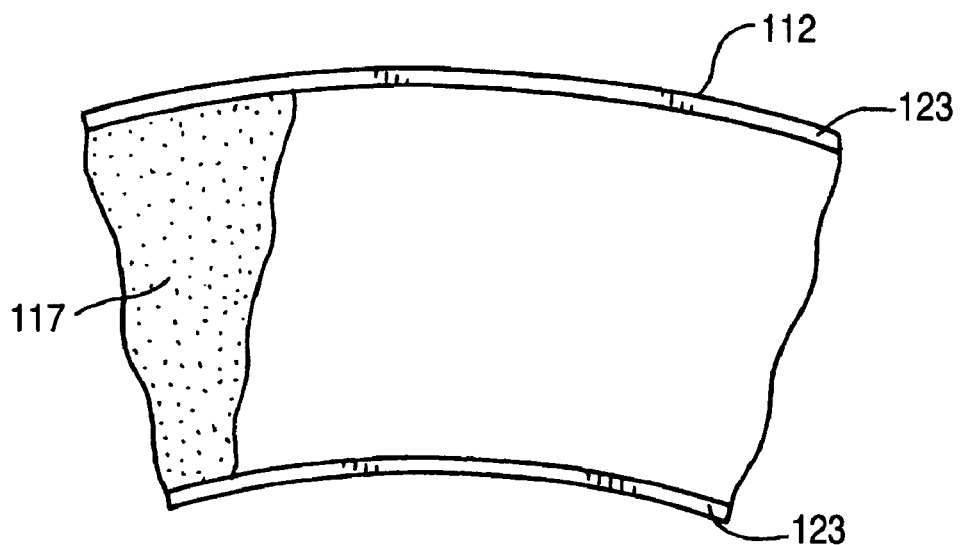
FIG. 14 is a side view of principal parts.

FIGS. 13 and 14 show a fourth embodiment of the magnetized pulsar ring according to the invention.

Referring to FIG. 13, a magnetized pulsar ring 102 includes a supporting member 111 fixed to an inner ring, and a magnetized element 112 provided in the supporting member 111.

The supporting member 111 includes a cylindrical portion 113 fitted to an outer periphery of the inner ring, and an outward flange portion 114 provided at a right end of the cylindrical portion 113.

The magnetized element 112 is a resin bonded magnet, and is fixed to the whole periphery of a right surface of the flange portion 114 of the supporting member 111 via an adhesive layer 117.

The adhesive layer 117 absorbs the difference between the deformation amount of the magnetized element 112, and the deformation amount of the supporting member 111, and, thereby, the stress generated in the magnetized element 112 becomes small. The thickness of the adhesive layer 117 is preferably 10 to 200 µm, and projections 123 that specify the thickness of the adhesive layer 111 are provided on a left surface (adhesive coating surface) of the magnetized element 112. The projection 123 is annularly continuously formed in each of rear outer and inner edges of the magnetized element 112, and the height thereof is set to 110 to 200 µm. Accordingly, by adjusting the thickness of the adhesive layer 111 to the height of the projections 123 and 124, the proper thickness of the adhesive layer 111 can be secured with high precision, and the magnetized element 112 can be fixed positively. Further, the projections 123 are provided at both of the radial outer and inner edges of the magnetized element 112. Thus, in a case where the supporting member 111 and the magnetized element 112 are adhered together with via an adhesive, protrusion of the adhesive in radial inward and outward directions can be prevented).

Figure 15:
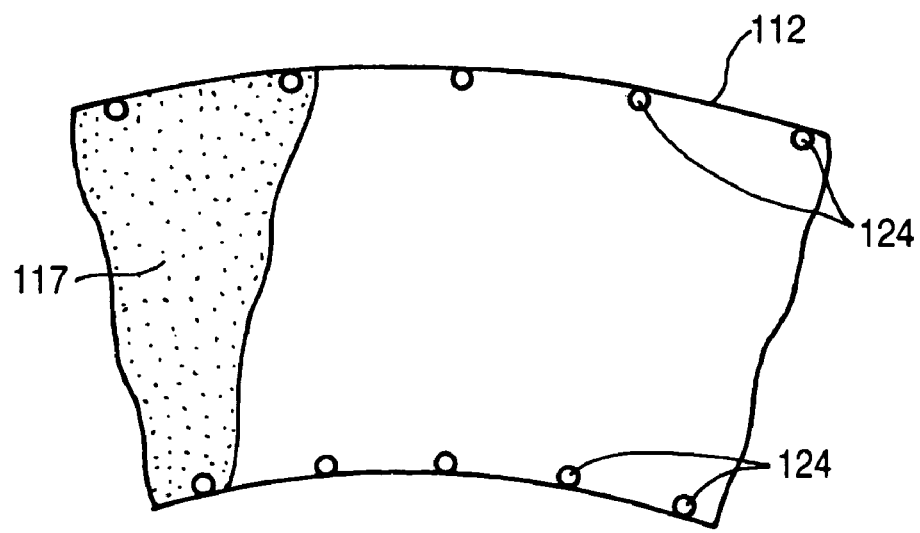
FIG. 15 is a side view of principal parts showing a modified example of the fourth embodiment.

The projections 123 of the embodiment shown in FIG. 13, as shown in FIG. 15, may be formed at the radial inner and outer edges of the magnetized element 112 at predetermined intervals as a plurality of point-like projections 124.

Fifth Embodiment

Figure 16:
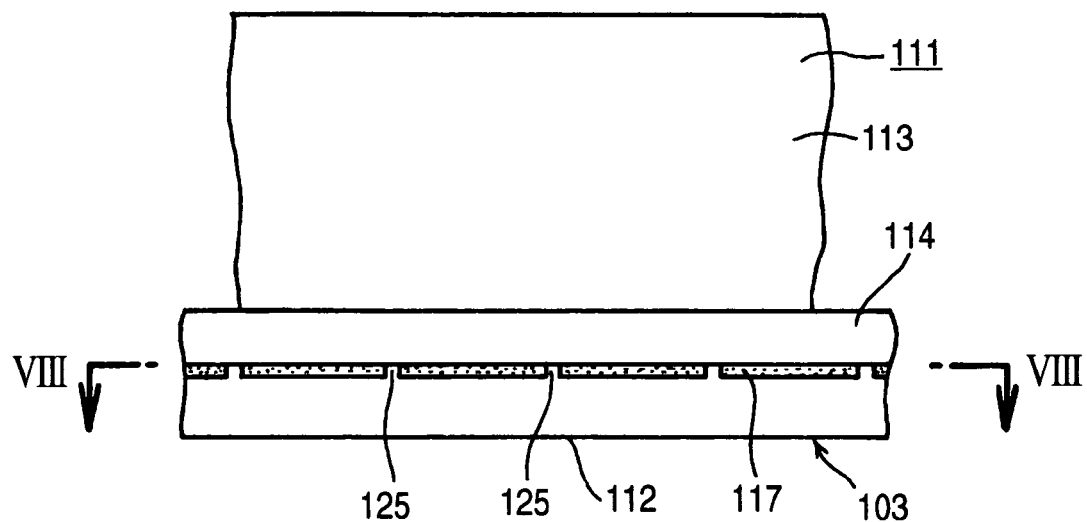
FIG. 16 is a view when a fifth embodiment of the magnetized pulsar ring according to the invention is seen from the radial outside.
Figure 17:
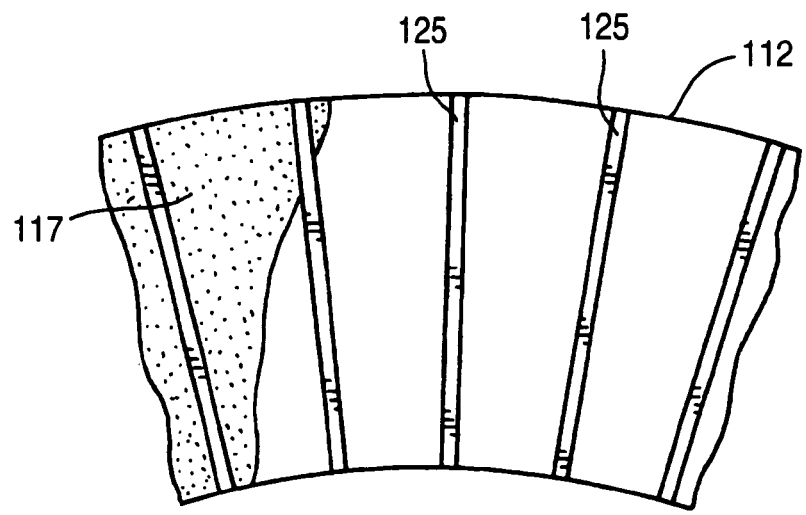
FIG. 17 is a sectional view taken along the line VIII-VIII of FIG. 16.

FIGS. 16 and 17 show a fifth embodiment of the magnetized pulsar ring according to the invention. FIG. 16 is a drawing when a drawing equivalent to FIG. 1 is seen from the top.

Referring to FIG. 16, a magnetized pulsar ring 103 includes a supporting member 111 fixed to an inner ring, and a magnetized element 112 provided in the supporting member 111.

The supporting member 111 includes a cylindrical portion 113 fitted to an outer periphery of the inner ring, and an outward flange portion 114 provided at a right end of the cylindrical portion 113.

The magnetized element 112 is a resin bonded magnet, and is fixed to the whole periphery of a right surface of the flange portion 114 of the supporting member 111 via an adhesive layer 117.

The adhesive layer 117 absorbs the difference between the deformation amount of the magnetized element 112, and the deformation amount of the supporting member 111, and, thereby, the stress generated in the magnetized element 112 becomes small. The thickness of the adhesive layer 117 is preferably 10 to 200 µm, and projections 125 that specify the thickness of the adhesive layer 111 are provided on a left surface (adhesive coating surface) of the magnetized element 112. The projections 125 extend from a radial outer end of the magnetized element 112 to a radial inner edge thereof, the projections 125 are arranged at predetermined intervals in the peripheral direction, and the height thereof is set to 10 to 200 µm. Accordingly, by adjusting the thickness of the adhesive layer 111 to the height of the projections 125, the proper thickness of the adhesive layer 111 can be secured with high precision, and the magnetized element 112 can be fixed positively.

Sixth Embodiment

Figure 18:
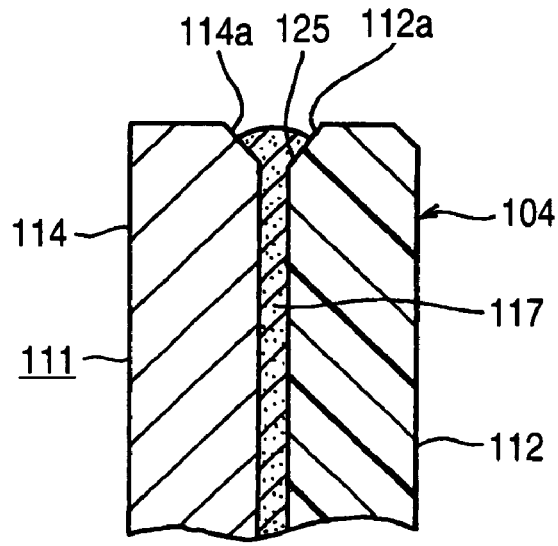
FIG. 18 is a sectional view showing a sixth embodiment of the magnetized pulsar ring according to the invention.

FIG. 18 shows a sixth embodiment of the magnetized pulsar ring according to the invention.

This embodiment is obtained by combination with the third embodiment, for example. In a magnetized pulsar ring 104 of FIG. 18, an outer edge of the flange portion 14 of the supporting member 111 and a radial outer edge of the magnetized element 112 are chamfered (14a), (12a), whereby annular recesses 125 that have a triangular cross section as a whole, and accommodate a protruding portion of the adhesive are formed. In the magnetized pulsar ring 101 of the third embodiment, if at least one of the supporting member 111 and the magnetized element 112 is coated with an adhesive, and both of them are made to abut against each other, the gap between the surface of the supporting member 111 on which the adhesive is coated, and the surface of the magnetized element 112 on which the adhesive is coated is specified by the projection 121. In this case, if the amount of the adhesive to be coated is large, portion of the adhesive may protrude from a portion where coating is required. The protruding portion, as shown in FIG. 18, is accommodated within the recesses 125, whereby the adhesive is prevented from adhering to an outer peripheral surface of the supporting member 111 or an outer peripheral surface of the magnetized element 112.

Figure 19:
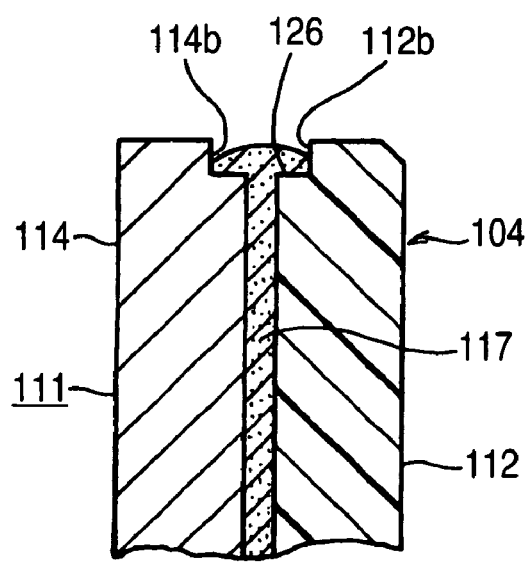
FIG. 19 is a sectional view of principal parts showing a modified example of the sixth embodiment.

The shape of the recesses is not limited to that of FIG. 18. As shown in FIG. 19, annular recesses 128 that have a quadrangular cross section as a whole, and accommodate a protruding portion of the adhesive may be formed by cutting away the outer edge of the flange portion 114 of the supporting member 111, and the radial outer edge of the magnetized element 112 in square shapes 114b and 112b in cross section.

The sixth embodiment can be combined with the fifth embodiment. Further, the sixth embodiment can be combined with the fourth embodiment by biasing the projections 23 of the radial outer edge radially inward.

Seventh Embodiment

Figure 20:
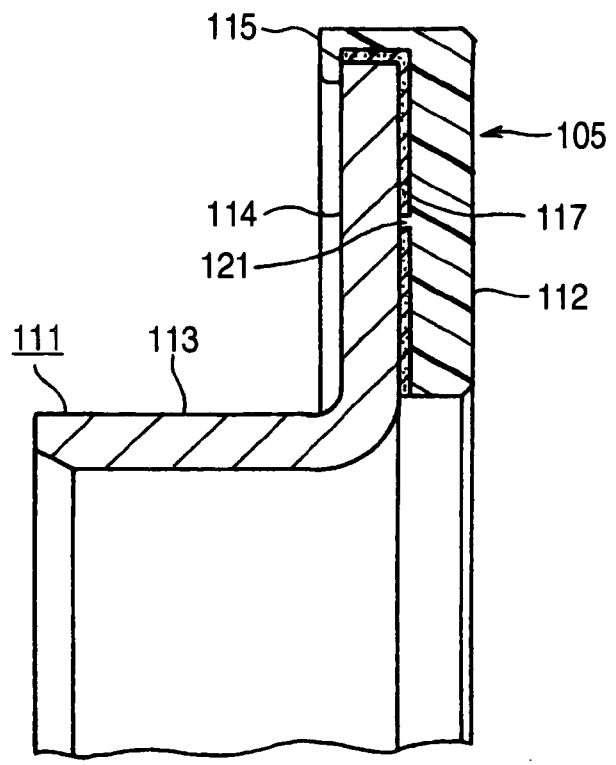
FIG. 20 is a sectional view showing a seventh embodiment of the magnetized pulsar ring according to the invention.
Figure 21:
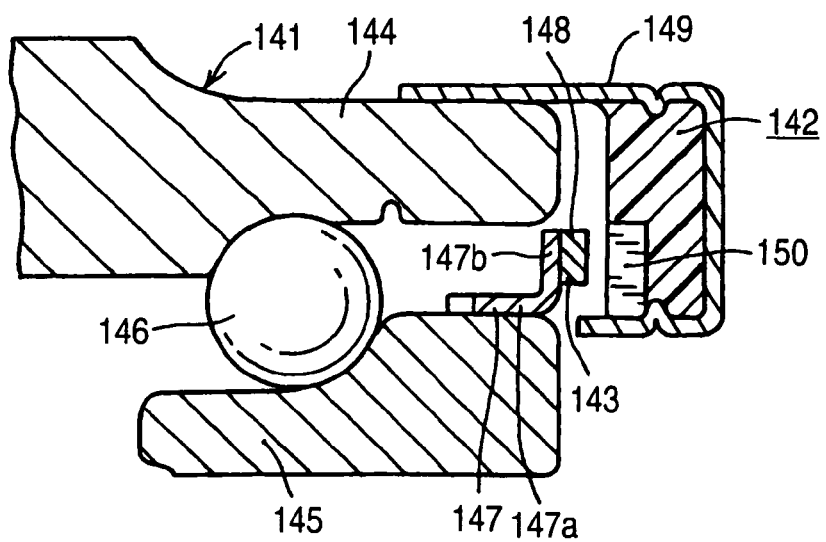
FIG. 21 is a sectional view showing an example of a rolling bearing device with a sensor to which the magnetized pulsar ring according to the invention is applied.
Figure 22:
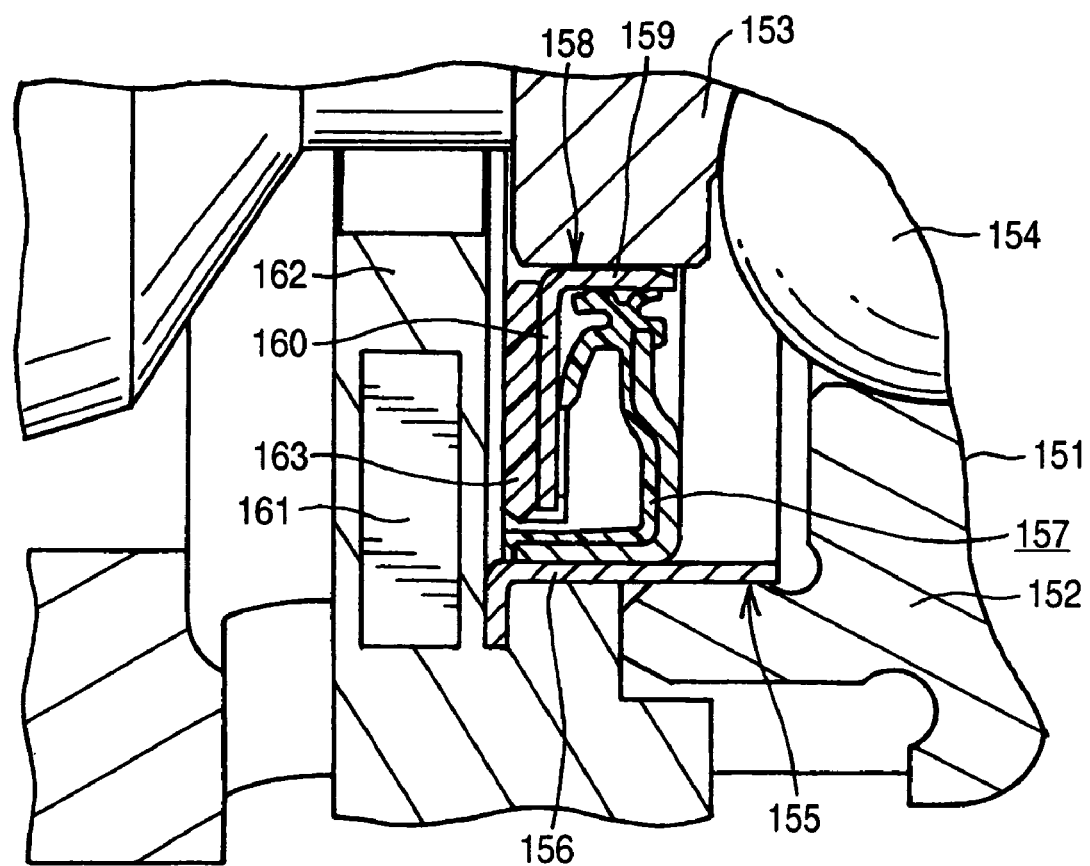
FIG. 22 is a sectional view showing another example of a rolling bearing device with a sensor to which the magnetized pulsar ring according to the invention is applied.

FIG. 20 shows a seventh embodiment of the magnetized pulsar ring according to the invention.

Referring to FIG. 20, a magnetized pulsar ring 105 includes a supporting member 111 fixed to an inner ring, and a magnetized element 112 provided in the supporting member 111.

The supporting member 111 includes a cylindrical portion 113 fitted to an outer periphery of the inner ring, and an outward flange portion 114 provided at a right end of the cylindrical portion 113.

The magnetized element 112 is a resin bonded magnet, and is fixed to the whole periphery of a right surface of the flange portion 114 of the supporting member 111 via an adhesive layer 117.

An outer periphery of the magnetized element 112 is provided with a slip-out preventing portion 115 that has an L-shaped cross-section, and that engages an outer periphery of the flange portion 114. This slip-out preventing portion 115 prevents the magnetized element 112 from slipping out of the supporting member 111.

The adhesive layer 117 absorbs the difference between the deformation amount of the magnetized element 112, and the deformation amount of the supporting member 111, and, thereby, the stress generated in the magnetized element 112 becomes small. The thickness of the adhesive layer 117 is preferably 10 to 200 µm, and a projection 121 that specifies the thickness of the adhesive layer 111 is provided on a left surface (adhesive coating surface) of the magnetized element 112. The same projection as that of the third embodiment is used as the projection 121, and by adjusting the thickness of the adhesive layer 11l to the height of the projections 121, the proper thickness of the adhesive layer 111 can be secured with high precision, and the magnetized element 112 can be fixed positively.

Although not shown, each adhesive layer 117 is not limited to one layer. For example, as two layers, an adhesive layer in contact with the outward flange portion 114 of the supporting member 111 can be formed of an adhesive having an affinity with metal, and an adhesive layer in contact with the magnetized element 112 can be formed of an adhesive having an affinity with resin.

What is claimed is:

1. A magnetized pulsar ring comprising:
   an annular supporting member;
   an annular magnetized element that is made of a resin bonded magnet and is fixed to the supporting member;
   an adhesive layer provided between the magnetized element and the supporting member for fixing the magnetized element and the supporting member; and
   a projection provided on the magnetized element and being in contact with the supporting member to specify a thickness of the adhesive layer.

2. The magnetized pulsar ring according to claim 1, wherein a recess adapted to accommodate an excess part of adhesive forming the adhesive layer is formed on at least one of an outer circumferential edge of the supporting member and an outer circumferential edge of the magnetized element.

3. The magnetized pulsar ring according to claim 1, wherein the projection is formed on at least a portion between an outer circumferential edge and an inner circumferential edge of the magnetized element.

4. The magnetized pulsar ring according to claim 3, wherein the projection extends in a circumferential direction of the magnetized element.

5. The magnetized pulsar ring according to claim 3, wherein the projection extends in a radial direction of the magnetized element.

6. The magnetized pulsar ring according to claim 1, wherein the magnetized element comprises a flange disposed in an outer side of an outer circumferential edge of the supporting member, and
   wherein the adhesive layer is provided between the flange and the outer circumferential edge of the supporting member.

7. A rolling bearing device comprising:
   a fixed ring;
   a rotating ring;
   a rolling element rollably arranged between the fixed ring and the rotating ring;
   a magnetized pulsar ring fixed to the rotating ring, the magnetized pulsar ring comprising:
      an annular supporting member;
      an annular magnetized element that is made of a resin bonded magnet and is fixed to the supporting member;
      an adhesive layer provided between the magnetized element and the supporting member for fixing the magnetized element and the supporting member: and
      a projection provided on the magnetized element and being in contact with the supporting member to specify thickness of the adhesive layer; and
   a magnetic sensor configured to detect magnetism of the magnetized pulsar ring to detect a rotation state of the rotating ring.

* * * * *